(12) United States Patent
Gullickson

(10) Patent No.: US 8,110,807 B2
(45) Date of Patent: Feb. 7, 2012

(54) REDIATION DETECTOR SYSTEM FOR LOCATING AND IDENTIFYING SPECIAL NUCLEAR MATERIAL IN MOVING VEHICLES

(75) Inventor: Richard Gullickson, Dumfries, VA (US)

(73) Assignee: The United States of America as represented by the Defense Threat Reduction Agency, Washington, DC (US)

( * ) Notice: Subject to any disclaimer, the term of this patent is extended or adjusted under 35 U.S.C. 154(b) by 489 days.

(21) Appl. No.: 12/382,015

(22) Filed: Mar. 6, 2009

(65) Prior Publication Data

US 2010/0224786 A1 Sep. 9, 2010

(51) Int. Cl.
*G01T 3/00* (2006.01)
(52) U.S. Cl. .................................................. 250/370.03
(58) Field of Classification Search .............. 250/370.03
See application file for complete search history.

(56) References Cited

U.S. PATENT DOCUMENTS

| | | | |
|---|---|---|---|
| 7,408,148 B2 * | 8/2008 | Proctor ...................... | 250/252.1 |
| 7,709,800 B2 * | 5/2010 | Proctor et al. ............. | 250/359.1 |
| 7,973,287 B2 * | 7/2011 | Craig et al. .................... | 250/394 |
| 2007/0205372 A1 * | 9/2007 | Pauly et al. ............. | 250/390.01 |
| 2010/0046690 A1 * | 2/2010 | Proctor et al. ................. | 376/154 |
| 2011/0019799 A1 * | 1/2011 | Shedlock ........................ | 378/87 |

FOREIGN PATENT DOCUMENTS

| | | | |
|---|---|---|---|
| GB | 2451953 A | * | 2/2009 |
| WO | WO 2007103925 A2 | * | 9/2007 |

OTHER PUBLICATIONS

Schumer et al., Development of an Intense Pulsed Characteristic γ-Ray Source for Active Interrogation of SNM, 2007 IEEE Nuclear Science Symp. Conf. Rec., Mar. 2007, 1026-1032.
Valentine, Overview of Nuclear Detection Needs for Homeland Security, http://www.ornl.gov/~webworks/cppr/y2001/pres/125015. pdf, 2001, Oak Ridge National Laboratory Website.
Hull et al., Glass Fiber Neutron Detectors, American Nuclear Society Transactions, vol. 89, p. 741, Nov. 2003.

(Continued)

*Primary Examiner* — David Porta
*Assistant Examiner* — Casey Bryant

(57) ABSTRACT

The invention uses a series of combined passive neutron and gamma ray sensors systematically placed along a path of commercial traffic, for example an airport runway, combined with a pulsed source of low energy protons and deuterons. The pulsed source produces monoenergetic gamma rays and low energy (60 keV) neutrons. This pulsed source uses a pinch-reflex ion diode operated on a pulsed power generator to produce proton beams. These beams bombard a PTFE (Teflon) target to produce characteristic gamma-rays. These gamma rays would induce a fission reaction in any fissile material creating gamma rays and neutrons. The passive sensors located in the path of commercial traffic would sense both the resultant gamma and neutron products of the reaction. The short interrogation pulse, approximately 50 nanoseconds, provides a timing marker which can be used to turn on the passive detectors after the interrogation pulse so as to avoid saturation and to enable measuring the spectrum of the fast neutrons using time of flight. The decay rate of the intensity of fast and slow (thermalized by interaction with the runway materials) neutrons provides an unambiguous signature of the presence of fissile material.

19 Claims, 5 Drawing Sheets

OTHER PUBLICATIONS

J.M. Hall et al., The Nuclear Car Wash: Neutron interrogation of cargo containers to detect hidden SNM, Nucl. Instr. and Meth. in Phys. Res. B 261 (2007) 337-340.

Nucsafe, Nucsafe Website, http://www.nucsafe.com/cms/Nuclear+Processes/54.html (Mar. 4, 2009).

Hull et al., Using Smart Threads to Interdict Radioactive Materials, USSOCOM Chemical, Biological, Radiological Conference & Exhibition, Dec. 2005, http://www.dtic.mil/ndia/2005.

* cited by examiner

REDIATION DETECTOR SYSTEM FOR LOCATING AND IDENTIFYING SPECIAL NUCLEAR MATERIAL IN MOVING VEHICLES

GOVERNMENT INTEREST

The invention described herein may be manufactured, used, sold, imported, and/or licensed by or for the Government of the United States of America without the payment to me of any royalties thereon.

FIELD OF INTEREST

This invention relates to remote nuclear/radiation detectors and, more particularly, to remote radiation detectors that locate the radiation source even when a vehicle within which the source maybe located is traveling at great speeds.

BACKGROUND OF THE INVENTION

Passive nuclear detection systems span a wide range of applications for homeland security employing both photon and neutron detection systems. The applications range from portable hand-held units to portal monitors located at ports of entry and at weigh stations along transportation corridors. Passive nuclear detection systems are used for standoff detection of special nuclear materials for search applications, imaging of special nuclear materials, radioisotope identification, and container and vehicle screening, just to name a few.

Over 7 million cargo containers enter U.S. ports each year. However, less than 2% of the actual containers are surveyed for the presence of radioactive materials when they arrive. The U.S. Department of Commerce anticipates the number of cargo containers entering the U.S. to quadruple over the next 20 years. This high volume of material movement is a significant challenge for interdicting any attempted shipment of nuclear material into the U.S because a balance between security and commerce must be established. Radiation portal monitors (RPMs) used in ports are mostly comprised of plastic scintillation detectors and some have additional neutron detectors that monitor containers by looking for counts that exceed a threshold. These portal monitors have cost that can exceed $150K. However, these systems are susceptible to variations in background radiation. Additionally, naturally occurring radioactive material (NORM) commonly encountered in commerce further exacerbates the problem. See Valentine, *Overview of Nuclear Detection Needs for Homeland Security*, http://www.ornl.gov/~webworks/cppr/y2001/pres/125015.pdf, 2001, Oak Ridge National Laboratory Website.

For these systems, there are many technological solutions for detecting gamma rays. Most of these rely on scintillation detectors and semiconductors. Inorganic scintillation detectors are commonly chosen as gamma-ray transducers because of their high-Z value and density. Additionally the light output of inorganic scintillation detector is more linear than that of organic scintillation detectors. Inorganic scintillation detectors are commonly fabricated using single-crystal growth methods such as the Bridgman or Czochralski techniques. However, while promising new materials have been grown using these techniques, like Sodium Iodide, NaI, and high purity Germanium, HGe, crystal growth continues to be a time-consuming and expensive method for production of scintillation materials for radiation detectors. Additionally, most single crystals are limited in size thereby imposing constraints on the final radiation detectors. Glass and ceramic scintillation detectors offer the potential for the fabrication of relatively inexpensive and plentiful detectors, yet glass scintillation detectors have suffered from relatively low light output. Ceramic scintillation detectors have received less attention over the past few decades but interest has been growing in the development of transparent polycrystalline ceramic materials.

Advanced spectroscopic portals (ASPs) have been deployed that have the capability to distinguish NORM from special nuclear materials. However, cost and production capacity limit the widespread deployment of ASPs. Handheld and portable radiation detection systems are used as a supplement for radiation portal monitors in some cases. These handheld and portable radiation detection systems can be gross counting systems or spectroscopic systems. The limitations of existing spectroscopic systems, be it resolution or the need for cryogenic cooling, require development of new detection systems based on new or improved detection materials or alternate cooling systems such as thermoelectric coolers. For high-resolution gamma spectroscopy measurements, the goal for energy resolution at full-width half maximum is less than 0.5% at 662 keV for a room temperature scintillation detector. This goal cannot be achieved with existing room temperature detectors; for example, the resolution for state of the art CZT detectors is approximately 1.7% at 662 keV (with very low detection probability).

Active nuclear detection systems are also commonly used for radiography or for secondary inspection. These systems employ neutron or gamma rays sources or both to either provide a detailed image of the cargo container, or to specifically identify special nuclear materials in cargo or containers. Such systems have been deployed at U.S. ports of entry and are used to further characterize items that are removed from containers. Transmission radiography is commonly employed to image suspect containers or containers chosen at random. These systems typically use an x-ray generator or mono-energetic gamma ray source to provide images of high-density and low-density materials in containers. Such systems are either fixed or mobile depending on the needs at the particular location.

Transmission radiography technologies may be useful to detect high Z materials that are often used in shielding, but these measurements do not verify the presence of special nuclear materials (SNM). Additionally, these systems cost nearly $1M each. The detection and verification of SNM is an important challenge for the Government. While advances in spectroscopic measurement systems will greatly enhance the probability of detecting nonshielded or weakly shielded SNM, the detection of shielded SNM and in particular shielded high-enriched uranium (HEU) poses a significant challenge that is best addressed using active detection systems.

Active interrogation techniques utilize both neutron and gamma ray sources and includes nuclear resonance fluorescence, neutron and gamma ray multiplicity, neutron radiography, and neutron and gamma ray induced fission. These systems can be utilized to inspect cargo in shipping container at seaports and border crossings, air transport containers, or to be deployed as mobile inspection systems. To support the development of these systems, additional research and development is needed in neutron and gamma ray sources, detection models, neutron and gamma ray emission data, and neutron and gamma ray simulation codes.

For security purposes, would be very helpful to have a radiation detection system for in-transit monitoring of containers or vehicles. These systems would have to be small, low-cost, tamper proof, and provide reasonable probability of detection of materials of interest. An extremely low false alarm rate would be a necessity as an alarm from one of these on-board sensors would require the ship to be delayed from docking. Hence, such in-transit sensors would need spectroscopic capability to distinguish special nuclear material from NORM and cosmic ray induced radiation.

Therefore, there exists a need for a remote directional detector/imager and identifier of special nuclear material and other radiation sources which can detect a radiation source at speed through commerce without the need to stop the commerce. The present invention addresses this need.

SUMMARY OF THE INVENTION

Accordingly, one object of the present invention is to provide a radiation detector which can detect special nuclear material and other radiation sources at the speed of normal commerce.

Another object of the present invention is to provide such a directional radiation detector which will not alter the commerce or pose a danger to the traveling public.

Still another object of the present invention is to provide a remote radiation detector which can detect radiation intensities down to background radiation.

Still another object of the present invention is to provide a remote radiation detector of various sources of radiation.

These and other objects are accomplished by the present invention which uses a series of combined passive neutron and gamma ray sensors systematically placed along a path of commercial traffic, for example an airport runway, combined with an active interrogation means such as a pulsed source of low energy protons and deuterons.

The pulsed source would produce monoenergetic gamma rays and low energy (60 keV) neutrons. A source of the requisite gamma-rays has been developed by the Navy as a potential probe to identify special nuclear material. This pulsed source uses a pinch-reflex ion diode operated on a Gamble II pulsed power generator to produce proton beams with 270-kA peak current and 2.0-MV peak voltage. These beams bombard a polytetrafluoroethylene (PTFE or Teflon®) target to produce characteristic gamma-rays by the $^{19}F(p, alpha\ gamma)\ ^{16}O$ reaction with energies of 6.13, 6.92, and 7.12 MeV and with an intensity of $3.1\times10^{11}$ gamma-rays into 4 pi in a single 50-ns duration pulse. Simple ballistic transport is used to transport the proton beam one meter so that the gamma-ray signal is separated in time and space from the diode bremsstrahlung pulse.

These low energy gamma rays and neutrons would be low enough in energy so as not to cause harm to humans, livestock, or other living beings, but would be high enough to induce a fission reaction in a moving, target radiation source, even if the target radiation source was shielded. The induced fission would then trigger a response from a set of combined gamma/neutron sensors in the path of the moving source positioned after the gamma pulse. In a preferred embodiment of the invention, a series of the combined passive gamma/neutron sensors would be positioned prior to the target radiation source being irradiated by the pulsed source, so that 1) either a difference in the series of combined gamma/neutron sensors before and after irradiation could be noted for a near flawless alarm rate; 2) the series of combined gamma/neutron sensors prior to irradiation could trigger the pulsed source to interrogate the target radiation source; or 3) a combination of both. Because of the fission reaction and fission products creating prompt and delayed gamma rays and fast neutrons that would ensue from the target radioactive source reacting from being struck by a pulsed source of low energy gamma radiation and neutrons, the passive sensors located in the stream of commerce after the radiation source was irradiated would sense both the resultant gamma and fast neutron products of the reaction. The short interrogation pulse, approximately 50 nanoseconds, provides a timing marker which can be used to turn on the passive detectors after the interrogation pulse so as to avoid saturation and to enable measuring the spectrum of the fast neutrons using time of flight. The decay rate of the intensity of fast and slow (thermalized by interaction with the runway materials) neutrons provides an unambiguous signature of the presence of fissile material.

Further, if combined sensors were positioned before the target radiation source was struck by the pulsed power source, the difference in reaction of the pre and post pulsed source sensors could also determine the type of fissile material on the target vehicle.

BRIEF DESCRIPTION OF THE DRAWINGS

These and other objects of the invention will become readily apparent in light of the Detailed Description of the Invention and the attached drawings wherein.

DETAILED DESCRIPTION OF THE INVENTION

Figure 1:
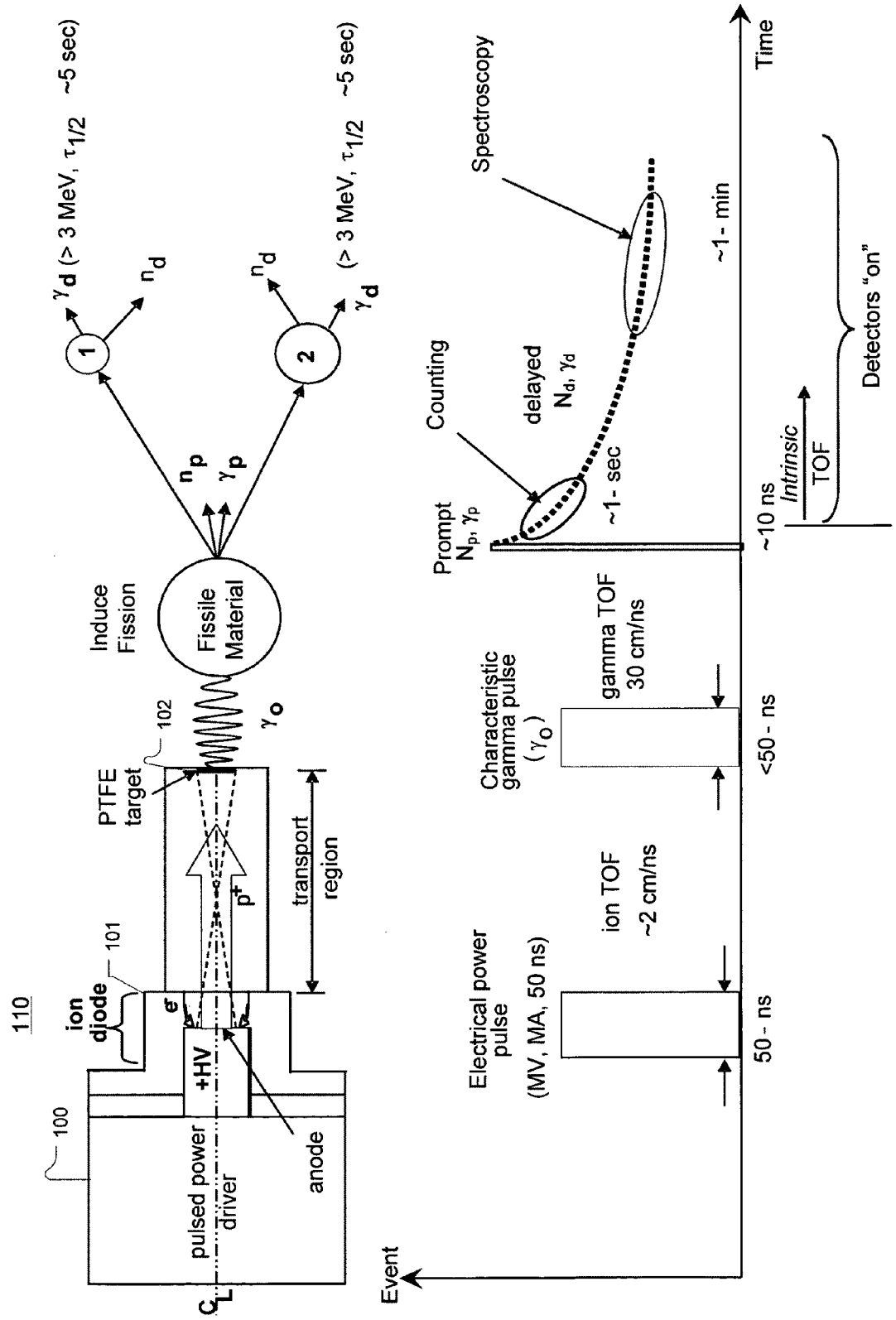
FIG. 1 is a diagrammatic view of one embodiment of pulsed monoenergetic gamma source according to the present invention, including a time of flight time line for the varying energies.

Now referring to FIG. 1, FIG. 1 shows a diagrammatic view of one embodiment of pulsed monoenergetic gamma source according to the present invention, including a time line for the varying energies and their time of flight. As shown, a pulsed source 110 produces monoenergetic gamma rays, $\gamma_0$. A similar pulsed source of gamma-rays was developed by the Navy as a potential probe to identify special nuclear material. Schumer et al., *Development of an Intense Pulsed Characteristic γ-Ray Source for Active Interrogation of SNM*, 2007 IEEE Nuclear Science Symp. Conf. Rec., March, 2007, 1026-1032. The pulsed source 110 according to the present invention uses a pinch-reflex ion diode 101 operated on a Gamble II pulsed power driver 100. The pulsed power driver 100 and ion diode 101 produce proton beams, p+, having a nominal 270-kA peak current and 2.0-MV peak voltage. The pulsed electrical power duration and energy is depicted in the time line. These beams bombard a polytetrafluoroethylene (PTFE or Teflon®) target 102 to produce the requisite gamma-rays $\gamma_0$. Simple ballistic transport is used to transport the proton beam one meter so that the gamma-ray signal is separated in time and space from the diode bremsstrahlung pulse. The gamma rays are produced by a $^{19}F$ (p, alpha gamma)/$^{16}O$ reaction as the protons bombard the PTFE target 102. Nominally, the resultant gamma rays, $\gamma_0$, have energies of 6.13, 6.92, and 7.12 MeV with an intensity of $3.1\times10^{11}$ gamma-rays in a 4 pi area in a single 50-ns duration pulse. The resultant gamma ray duration and energy is graphically shown in the time line of FIG. 1. The resultant low energy gamma rays would be low enough in energy so as not to cause harm to humans, livestock, or other living beings, but would be high enough to induce a fission reaction in a moving, target radiation source, even if the target radiation source was shielded.

Also as depicted in FIG. 1, when the monoenergetic (6-18 MeV) gamma rays or low energy (60 keV) neutrons strike a target of Fissionable Material, for example Special Nuclear Material (SNM), the gamma rays will induce a fission reaction within the target. The target need not be SNM (e.g. Pu239 or U235), but can be any fissionable (e.g. U238) material. The fission reaction will produce prompt gamma rays and neutrons ($n_p$, $\gamma_p$) and the radioactive fission fragments will produce delayed gamma rays and neutrons. These gamma rays and neutrons ($n_p$, $\gamma_p$) then can be detected by standard gamma ray detectors and neutron detectors.

Both of these types of detectors are well known in the art. However, according to the present invention, a combination of a gamma ray detector and neutron detector is used to verify the fission reaction caused by a target fissile source being bombarded by the pulsed low energy gamma rays.

Figure 2:
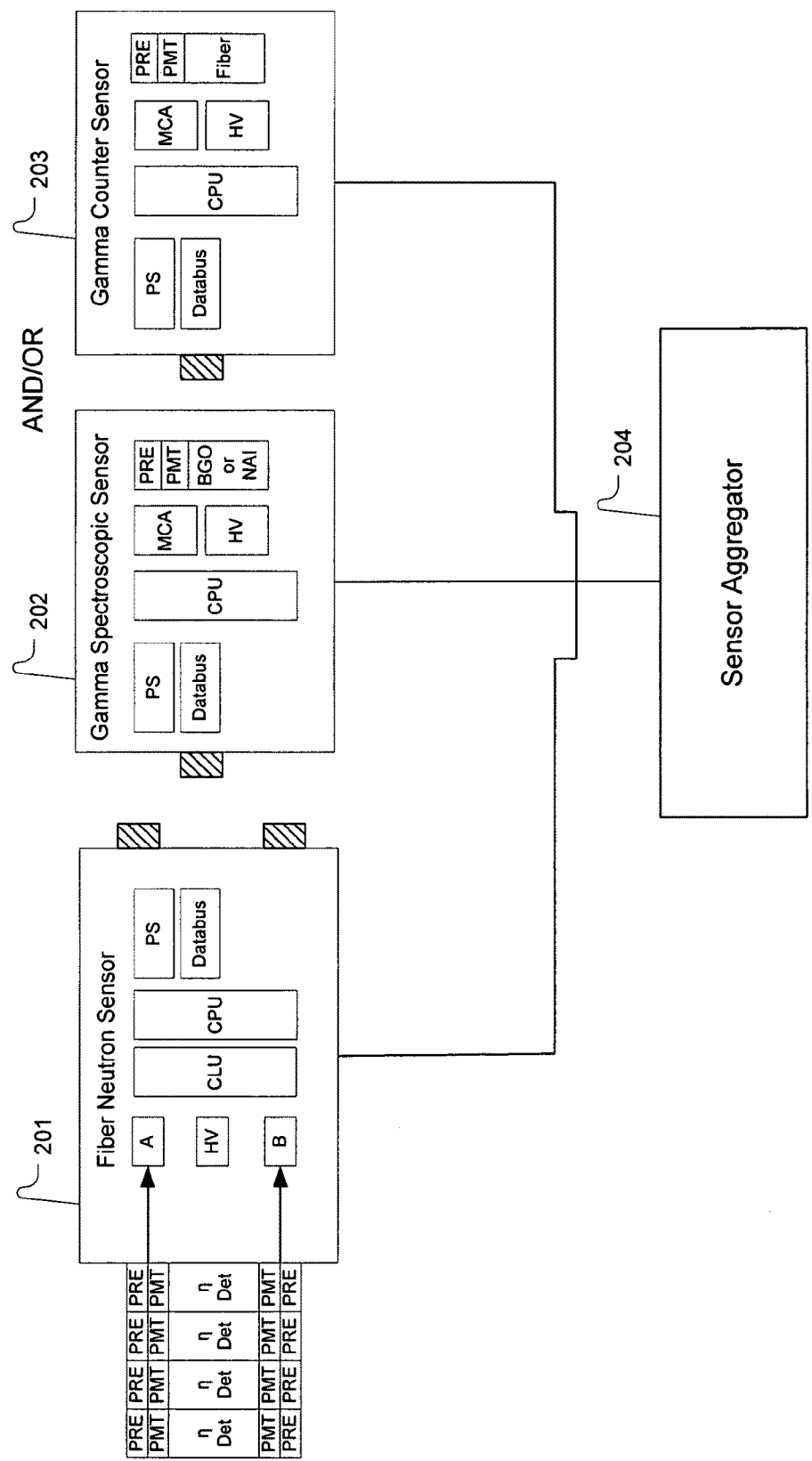
FIG. 2 is a diagrammatic view of the one embodiment of the combined passive gamma-neutron sensors according to the present invention.

Now referring to FIG. 2, FIG. 2 shows a combined passive neutron and gamma ray sensor according to the present invention. Preferably, the Neutron Fiber Sensor 201 is an Lithium (Li) Silicate Fiber Neutron Sensor (NFS) and the Gamma Counter Sensor (GCS) 203 is either a Polyvinyltoluene (PVT) type sensor (or also known as a PVT Gamma Counter Sensor) or, most preferably, a fiber type sensor. The Gamma sensor can also be a spectroscopic type or a Gamma Spectroscopy Sensor (GSS) 202 or both.

Each sensor regardless whether it is a neutron or gamma ray sensor contains a radiation detector portion, a High Voltage (HV) supply, signal processing electronics, and a microprocessor(s). As shown, a system sensor aggregator 204 is used to collect the data packets from sensors, calculate alarm information, drive packets to an Operator Display, and/or integrates any positioning data from a global positioning device (GPS). Generally, the spectroscopic gamma sensors 202 use a scintillator material such as Bismuth Germanate (BGO) or Sodium Iodide (NaI) connected to a photomultiplier tube (PMT), a multichannel analyzer (MCA) and computer processing unit (CPU) to analyze the signals and a databus with serial port. Similarly, the basic components of the neutron sensor would be the neutron detector, ηdet, with PMTs coupled to inputs A and B (A second plain fiber is necessary to cancel out the scintillation naturally occurring in the fiber), a common logic unit (CLU) connected to a CPU and the serial databus and outputs.

Figure 3:
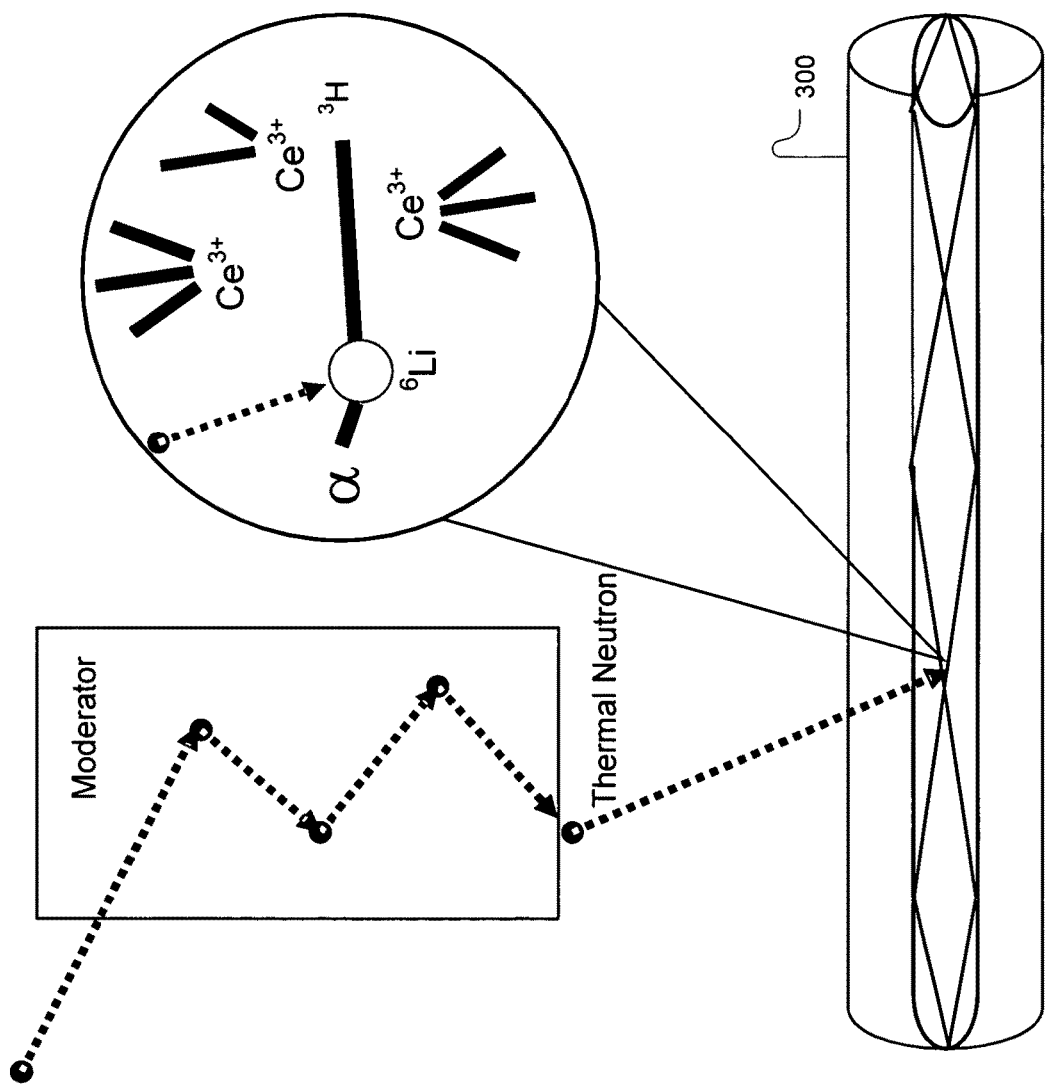
FIG. 3 is a cross-section view with an expanded view of the reaction that occurs in a lithium doped optical fiber according to the present invention.

Preferably for this embodiment and as shown in FIG. 3, the detection in the lithium doped fiber 300 would occur based on the reaction the neutrons would cause in lithium doped optic fibers. Once the neutrons interact with the lithium doped fiber, the neutrons are thermalized. Thermal neutrons are then captured by the lithium ($^6$Li) and the Alpha particles and Tritium Tritons excite the Cesium ($Ce^{3+}$) ion. The $Ce^{3+}$ ion then fluoresces and visible photons are transmitted through fiber to photomultiplier tube (PMT).

Because the $^6$Li atom has a large cross-section for thermal neutrons, thermalization can occur anywhere from the neutron source, typically Pu atoms, to the detector. A good neutron moderator to maximize thermalization before the neutron reaches the glass fiber should surround the neutron sensor.

For devices employing neutron sensors manufactured by Nucsafe, Inc., the preferred neutron sensor type, once a neutron is incident on the fibers, there is nearly 50% efficiency for its interaction within the glass. As stated above, the $^6$Li atom absorbs the thermal neutron and the reaction products include a Tritium ion and an alpha particle. Although the range of alpha particles is small, there is a high probability that the alpha particle will interact with the $Ce^{3+}$ atom in the glass causing one of its electrons to be raised to an excited state. The de-excitation of the $Ce^{3+}$ atom's electron to a ground state results in the emission of visible light, a fluorescence event.

Because scintillation can also result from gamma rays that produce energetic photoelectrons in the glass, a second gamma ray sensor should also be used to differentiate between the scintillation that occurs due to gamma rays in the neutron sensor and the scintillation that occurs due to the thermalized neutron reaction. Further, the gamma ray sensor also acts as a passive sensor even if the pulsed power monoenergetic gamma ray source is not actively interrogating a target.

Figure 4:
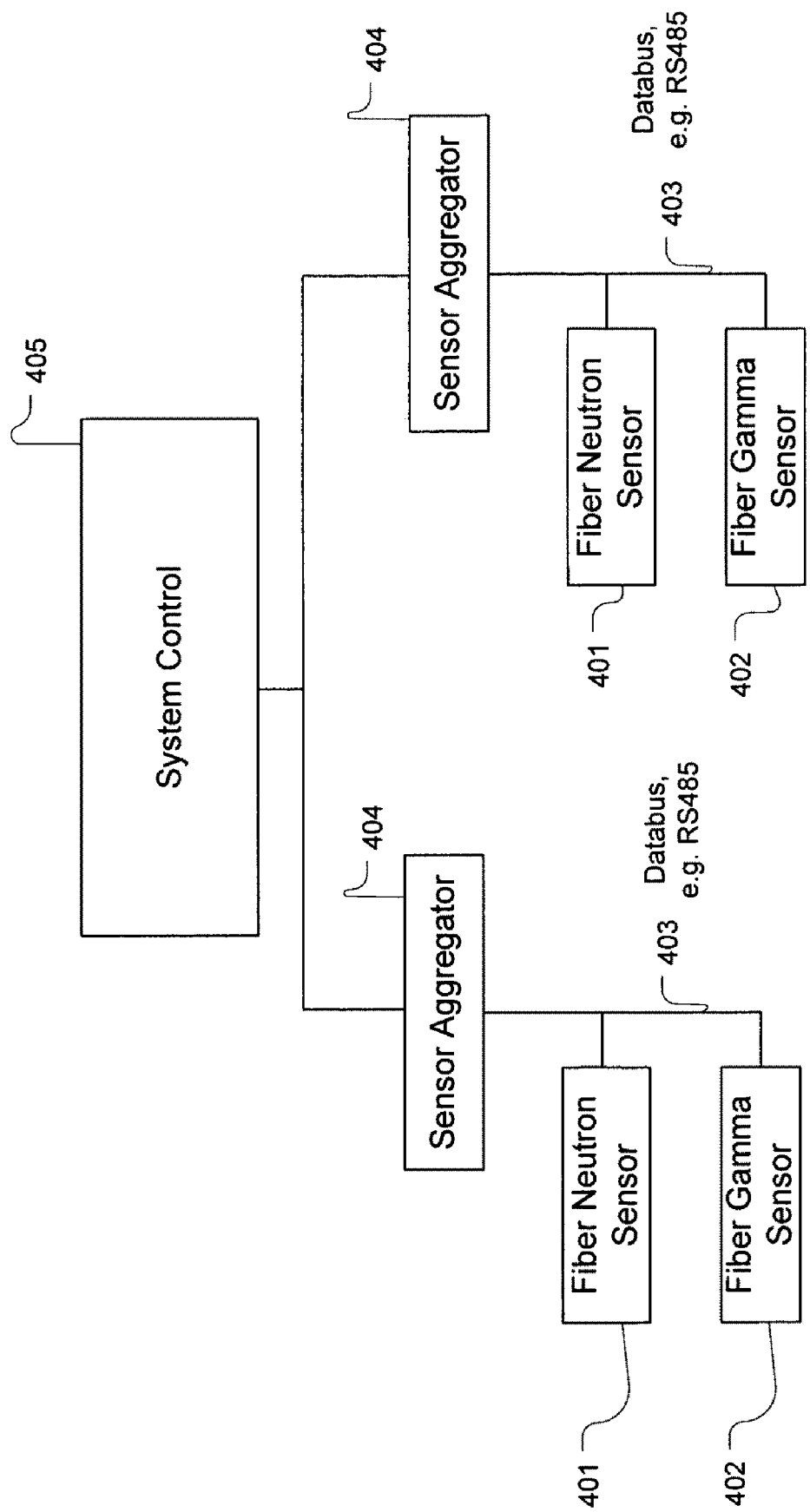
FIG. 4 is a conceptual illustration of the requisite communications and data packet necessary for the combined passive gamma-neutron sensors according to the present invention.

As shown partially in FIG. 4, when the induced fission triggers a response from the set of combined gamma/neutron sensors 401 and 401 in the path of the moving source, an alarm could be triggered or further combined passive sensors could be used to track the position of the moving source. Additionally, in a preferred embodiment of the invention, a series of the combined passive gamma/neutron sensors (as shown) would be positioned prior to the target radiation source being irradiated by the pulsed source, so that 1) either a difference in the series of combined gamma/neutron sensors before and after irradiation could be noted for a near flawless alarm rate; 2) the series of combined gamma/neutron sensors prior to irradiation could trigger the pulsed source to interrogate the target radiation source; or 3) a combination of both. The sensor aggregators 404 would be programmed to alarm or send any information received from the sensors and the combination of the sensor aggregators would be sent to a system control 405 that would activate the pulse generator in a predetermined manner, alarm, or do any number of functions those skilled in the art could readily apply to the system.

Because of the fission reaction that would ensue, the passive sensors located in the stream of commerce after the radiation source was irradiated would sense both the resultant gamma and fast neutron products of the reaction. The short interrogation pulse, approximately 50 nanoseconds, provides a timing marker which can be used to turn on the passive detectors after the interrogation pulse so as to avoid saturation and to enable measuring the spectrum of the fast neutrons using time of flight. The decay rate of the intensity of fast and slow (thermalized by interaction with the runway materials) neutrons provides an unambiguous signature of the presence of fissile material.

Further, if combined sensors were positioned before the target radiation source was struck by the pulsed power source, the difference in reaction of the pre and post pulsed source sensors could also determine the type of fissile material on the target vehicle.

Figure 5:
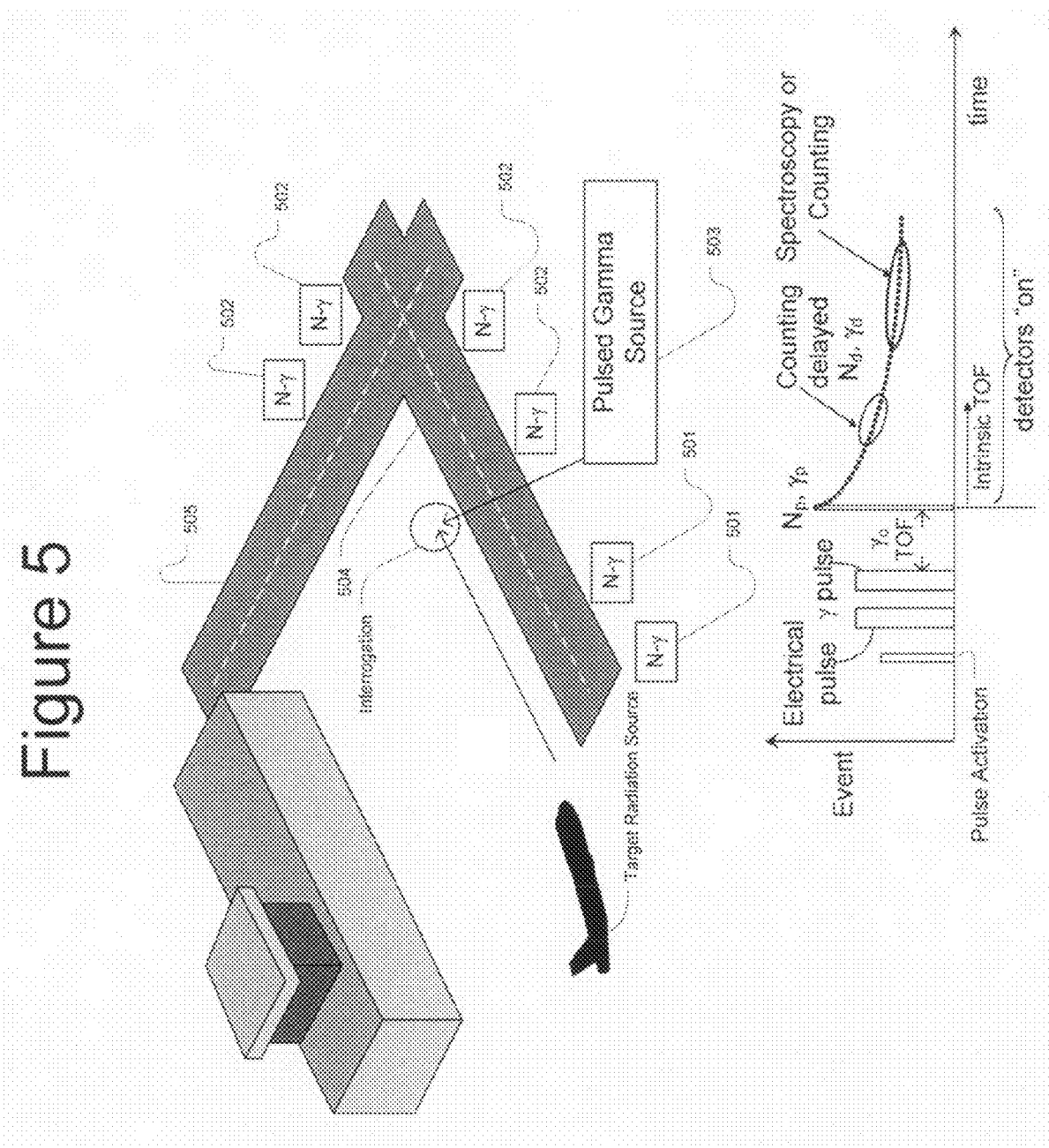
FIG. 5 is a diagrammatic view of the present invention as it would configured in commercial transit.

At an airport, as depicted in FIG. 5, the invention would use a combination of a fiber optic based passive neutron and gamma ray sensors 501 and 502 embedded in a center line groove in the runway 505 combined with an active pulsed gamma ray and neutron active interrogation system 503 (more fully described in reference to FIG. 1) to enhance signatures from fissile material by inducing fission or other nuclear reactions, as stated above. The active system would be triggered by the passage of the aircraft taking off or landing (pulse activation shown in the time line graph similar that in FIG. 1) and would be operated so as to minimize radiation dose. For an airport, the fact that there are a limited number of paved runways and taxiways would serve as a way to control the target vehicle upon alarm. The invention would be effective either at the airport of debarkation or embarkation.

As shown, the gamma/neutron sensors 501 would trigger the pulse activation and the gamma/neutron sensors 502 would sense the fissile reaction and delayed gamma/neutron products from the fissile reaction. One fiber would be neutron sensitive; the other fiber would omit the Li6 to maximize gamma detection without neutron sensitivity. As shown in FIG. 5, the pulsed power based active interrogation system embedded in runway around 500' from each end produces pulse of monoenergetic gammas and low energy neutrons when the airplane passes by, triggering the pulse. This can be operated so as to trigger the neutron and gamma ray pulse selectively (e.g. when radiation is detected as the aircraft taxies into position on the active runway). The passive detectors would then monitor die away of neutrons and gammas from induced fission as shown in the timeline graph.

Because aircraft or trucks moving through a weigh station have a more limited (in comparison to maritime ship traffic) capability for extensive shielding to reduce signatures, a modest active interrogation stimulation with limited dose could be sufficient to produce an adequate signal a few meters away in a runway or roadway detector. This would provide an unambiguous signal from a distributed detection system clearly indicating the presence of fissile (or radiological) material. By making the identification at the foreign airport, there would be ample time to interdict and divert for inspection any aircraft which triggered an alarm for this automated detection system.

Also, materials from sophisticated state produced nuclear weapons may have a sufficient signature for passive radiation detection without use of the active interrogation component, therefore eliminating any radiation dose in most scenarios. Indications of radiation from an aircraft preparing to take off could trigger the active system for a better determination of the nature of the material.

The best mode of the invention would use "Smart Threads Integrated Radiation Sensors" (STIRS) technology combined with the Navy's active interrogation approach (the pulse power generator referenced above) which uses pulsed low energy protons and deuterons to produce monoenergetic gamma rays and low energy (60 keV) neutrons to induce fission. Specifically, a number of STIRS fiber pairs would be embedded length of runway in center line.

As those skilled in the art will recognize, distributed discrete sensors could be substituted for the STIRS sensors or additional sensors with gamma resolution could be added, but the STIRS sensors should provide sufficient sensitivity in a rugged configuration at a reasonable cost which would be more than adequate to monitor the die away of the neutrons from induced fission.

It is to be understood that other features and modifications to the foregoing detailed description are within the contemplation of the invention which is not limited by this description. As will be further appreciated by those skilled in the art, any number of configurations of radiation detectors and pulse power sources can achieve the results described herein. Accordingly, the present invention should not be limited by the foregoing description, but only by the appended claims.

What is claimed is:

1. A radiation detector capable of detecting a radiation source at speed in commerce comprising:
   at least two passive neutron sensors for detecting neutrons comprising a means to send a signal indicating the presence of neutrons in excess of normal atmospheric neutrons;
   at least two passive gamma ray sensors for detecting gamma rays comprising a means to send a signal indicating the presence of gamma rays in excess of normal atmospheric gamma rays;
   at least two sensor aggregators for aggregating and processing the signals from the passive neutron sensor and the passive gamma ray sensor;
   a means for producing a pulse of monoenergetic gamma rays and low energy neutrons sufficient to induce a fissile reaction producing neutrons and gamma rays from the radiation source traveling at speed in commerce, wherein the pulse of monoenergetic gamma rays and low energy neutrons provides a timing marker which is used to turn on the passive gamma ray detector and the passive neutron detector after the pulse so as to avoid saturation and to enable measuring the spectrum of the fast neutrons using time of flight; and wherein the passive neutron sensor and passive gamma ray sensor detect the neutron and gamma ray product from the fissile reaction;
   wherein a first passive neutron sensor and a first passive gamma ray sensor are connected to a first sensor aggregator and the first passive neutron and gamma ray sensors and first sensor aggregator are positioned prior to the means for producing a pulse of monoenergetic gamma rays and low energy neutrons such that the first sensor aggregator activates the means for producing a pulse of monoenergetic gamma rays and low energy neutrons when a predetermined level of neutrons and gamma rays are sensed by the first passive neutron sensor and the first passive gamma ray sensor; and
   wherein a second passive neutron sensor and a second passive gamma ray sensor are connected to a second sensor aggregator and the second passive neutron and gamma ray sensors and second sensor aggregator are positioned after the means for producing a pulse of monoenergetic gamma rays and low energy neutrons such that the second passive neutron and gamma ray sensors can detect any neutrons and gamma rays resulting from the fissile reaction after activation of the means for producing a pulse of monoenergetic gamma rays and low energy neutrons.

2. The detector of claim 1 wherein a first plurality of passive neutron sensors, passive gamma ray sensors and sensor aggregators are positioned prior to the means for producing a pulse of monoenergetic gamma rays and low energy neutrons.

3. The detector of claim 2 wherein a second plurality of passive neutron sensors, passive gamma ray sensors and sensor aggregators are positioned after the means for producing a pulse of monoenergetic gamma rays and low energy neutrons.

4. The detector of claim 3 wherein the passive neutron sensors are lithium doped fiber type passive neutron sensors.

5. The detector of claim 3 wherein the passive gamma ray sensors are scintillation fiber type gamma ray sensors.

6. The detector of claim 3 wherein the passive gamma ray sensors are spectroscopic gamma ray sensors.

7. The detector of claim 1 wherein the means for producing a pulse of monoenergetic gamma rays and low energy neutrons uses a pinch-reflex ion diode operated on a pulsed power generator to produce proton beams with a predetermined peak current and a predetermined peak voltage; and wherein the proton beams bombard a polytetrafluoroethylene target to produce the monoenergetic gamma-rays by the $^{19}$F-$^{16}$O reaction in a single duration pulse.

8. The detector of claim 7 wherein means for producing a pulse of monoenergetic gamma rays and low energy neutrons produces characteristic gamma-rays with energies of 6.13, 6.92, and 7.12 MeV and with an intensity of $3.1\times10^{11}$ gamma-rays into 4 pi in a single 50-ns duration pulse.

9. A radiation detector capable of detecting a radiation source at speed in commerce comprising:
- at least two combined passive neutron and gamma ray sensors, comprising a passive neutron sensor, a passive gamma ray sensor, and a sensor aggregator;
- means for producing a pulse of monoenergetic gamma rays and low energy neutrons;
- wherein a first combined sensor is positioned prior to the means for producing a pulse of monoenergetic gamma rays and low energy neutrons such that the aggregator activates the means for producing a pulse of monoenergetic gamma rays and low energy neutrons to activate when a predetermined level of neutrons and gamma rays are sensed by the first combined sensor;
- wherein the pulse of monoenergetic gamma rays and low energy neutrons provides a timing marker which is used to turn on a second combined sensor after the pulse so as to avoid saturation and to enable measuring the spectrum of the fast neutrons using time of flight; and
- wherein the second combined sensor is positioned after the means for producing a pulse of monoenergetic gamma rays and low energy neutrons such that the second combined sensor detects any neutrons and gamma rays resulting from the fissile reaction after activation of the means for producing a pulse of monoenergetic gamma rays and low energy neutrons.

10. The detector of claim 9 wherein the passive neutron sensors are lithium doped fiber type passive neutron sensors.

11. The detector of claim 9 wherein the passive gamma ray sensors are scintillation fiber type gamma ray sensors.

12. The detector of claim 9 wherein the passive gamma ray sensor are spectroscopic gamma ray sensors.

13. The detector of claim 9 wherein the means for producing a pulse of monoenergetic gamma rays and low energy neutrons uses a pinch-reflex ion diode operated on a pulsed power generator to produce proton beams with a predetermined peak current and a predetermined peak voltage; and
- wherein the proton beams bombard a polytetrafluoroethylene target to produce the monoenergetic gamma-rays by the $^{19}F$-$^{16}O$ reaction in a single duration pulse.

14. The detector of claim 13 wherein means for producing a pulse of monoenergetic gamma rays and low energy neutrons produces characteristic gamma-rays with energies of 6.13, 6.92, and 7.12 MeV and with an intensity of $3.1\times10^{11}$ gamma rays into 4 pi in a single 50-ns duration pulse.

15. The detector of claim 9 wherein combined passive neutron and gamma ray sensors are embedded in a path of commerce.

16. The detector of claim 15 wherein the path of commerce is an airport runway.

17. The detector of claim 16 wherein the means for producing a pulse of monoenergetic gamma rays and low energy neutrons is aimed to target departing or arriving aircraft.

18. The detector of claim 15 wherein the path of commerce is a roadway.

19. The detector of claim 18 wherein the means for producing a pulse of monoenergetic gamma rays and low energy neutrons is aimed to target passing vehicles.

* * * * *